US012531324B2

(12) United States Patent
Chen et al.

(10) Patent No.: US 12,531,324 B2
(45) Date of Patent: Jan. 20, 2026

(54) ANTENNA BASE AND ANTENNA SET

(71) Applicant: HTC Corporation, Taoyuan (TW)

(72) Inventors: Peng Kuang Chen, Taoyuan (TW); Wei-Cheng Liu, Taoyuan (TW); Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 246 days.

(21) Appl. No.: 18/473,283

(22) Filed: Sep. 25, 2023

(65) Prior Publication Data

US 2024/0195046 A1 Jun. 13, 2024

Related U.S. Application Data

(60) Provisional application No. 63/431,750, filed on Dec. 12, 2022.

(51) Int. Cl.
*H01Q 1/22* (2006.01)
*H01R 24/52* (2011.01)

(52) U.S. Cl.
CPC ............... *H01Q 1/22* (2013.01); *H01R 24/52* (2013.01)

(58) Field of Classification Search
CPC .. H01Q 1/22; H01Q 1/20; H01Q 3/02; H01Q 21/00; H01R 24/52
See application file for complete search history.

(56) References Cited

U.S. PATENT DOCUMENTS

| | | | | | |
|---|---|---|---|---|---|
| 8,514,144 | B2 * | 8/2013 | Gray | H01Q 1/12 343/718 |
| 11,575,217 | B2 * | 2/2023 | Patel | H01Q 1/246 |
| 2011/0242754 | A1 | 10/2011 | Morton | |
| 2017/0149115 | A1 | 5/2017 | Sierzenga et al. | |
| 2020/0259248 | A1 * | 8/2020 | Lv | H01Q 21/28 |
| 2021/0028561 | A1 * | 1/2021 | Yang | H01Q 21/30 |
| 2023/0335916 | A1 * | 10/2023 | Zhang | H01Q 21/28 |

FOREIGN PATENT DOCUMENTS

| | | |
|---|---|---|
| CN | 101276236 | 10/2008 |
| TW | M405651 | 6/2011 |

OTHER PUBLICATIONS

"Office Action of Taiwan Counterpart Application", issued on Oct. 14, 2024, p. 1-p. 7.

* cited by examiner

*Primary Examiner* — Hai V Tran
(74) *Attorney, Agent, or Firm* — JCIPRNET

(57) ABSTRACT

An antenna base and an antenna set. The antenna set includes a host and the antenna base. The host is fixed with a plurality of first connectors. The host is detachably assembled to the antenna base. The antenna base includes a body, a plurality of antennas and a plurality of second connectors. The antenna is installed at the body. The second connectors are electrically connected to the antennas. The assembling of the host and the body and the electrical and structural connection of the first connector and the second connector are completed in the same time.

10 Claims, 10 Drawing Sheets

ANTENNA BASE AND ANTENNA SET

CROSS-REFERENCE TO RELATED APPLICATION

This application claims the priority benefit of U.S. provisional application Ser. No. 63/431,750, filed on Dec. 12, 2022. The entirety of the above-mentioned patent application is hereby incorporated by reference herein and made a part of this specification.

BACKGROUND

Technical Field

The application relates to an antenna base and an antenna set, and in particular, to an antenna base and antenna set with multiple antennas.

Description of Related Art

In order to support multiple communication standards, wireless communication devices need to be equipped with multiple antennas. When installing multiple antennas with different frequency bands, it is necessary to confirm whether the connector type and supported frequency band of each antenna are correct. Moreover, the connectors of traditional antennas are connected to the device through rotation and locking, which must be assembled one by one, which is time-consuming and labor-intensive.

SUMMARY

The present application provides an antenna base and an antenna set, which can improve the time-consuming and labor-intensive installation.

The antenna base of the application is used for a host detachably assembled thereon. The host is fixed with a plurality of first connectors. The antenna base includes a body, a plurality of antennas and a plurality of second connectors. The antenna is installed at the body. The second connectors are electrically connected to the antennas. The assembling of the host and the body and the electrical and structural connection of the first connector and the second connector are completed in the same time.

The antenna set of the application includes a host and the antenna base. The host is fixed with a plurality of first connectors. The host is detachably assembled to the antenna base. The antenna base includes a body, a plurality of antennas and a plurality of second connectors. The antenna is installed at the body. The second connectors are electrically connected to the antennas. The assembling of the host and the body and the electrical and structural connection of the first connector and the second connector are completed in the same time.

Based on above, in the antenna base and the antenna set of the application, since the assembly of the host and the body and the connection of the first connector and the second connector are completed simultaneously, the assembly process can be simplified and assembly time can be saved.

DESCRIPTION OF THE EMBODIMENTS

Figure 1:
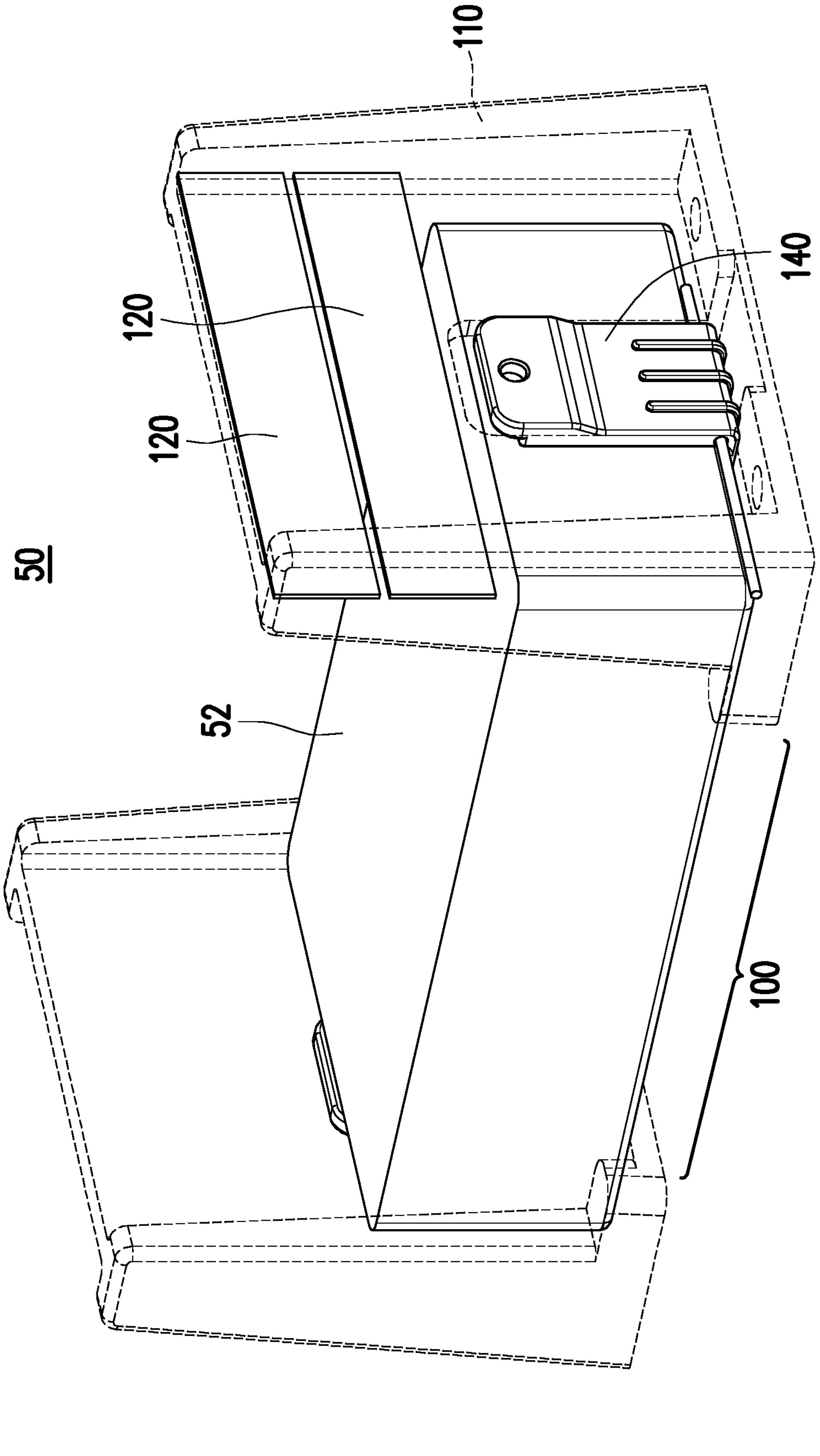
FIG. 1 is a schematic diagram of an antenna set according to an embodiment of the present invention.

FIG. 1 is a schematic diagram of an antenna set according to an embodiment of the present invention. Referring to FIG. 1, the antenna set 50 of the embodiment includes a host 52 and an antenna base 100. The host 52 can be easily disassembled and assembled on the antenna base 100. That is to say, the host 52 is not fixed on the antenna base 100. Instead, the host 52 can be assembled on the antenna base 100 or the host 52 can be detached from the antenna base 100 as required. Moreover, multiple antenna bases 100 can be pre-installed at multiple locations, for example, one or more the antenna bases 100 can be installed in multiple gaming venues in a large shopping mall, and the hosts 52 are assembled to the antenna bases 100 in these gaming venues as needed. The antenna set equipped in each antenna base 100 has, for example, different bandwidth characteristics, including narrowband, wideband or ultra-wideband, or provides dual-band or multi-band antenna sets according to different environmental requirements. For example, one antenna base 100 can be installed in each area such as the living room, study room, game room, and studio, and the host 52 can be assembled to the corresponding antenna base 100 according to the bandwidth requirements or frequency range requirements of each area.

Therefore, users do not need to purchase multiple expensive hosts 52 and install them in these gaming venues respectively, but only need to purchase one host 52 to meet the bandwidth and frequency usage requirements in different venues. In addition, installing multiple antenna bases 100 in multiple locations in advance can also save time on installation and fixing each time. Secondly, when the host 52 is not needed, the host 52 can also be removed for easy maintenance or to avoid being stolen or damaged. All in all, the application provides a flexible and convenient design of the antenna set, which can flexibly adjust the configuration of the antenna according to usage needs, so that the antenna can operate efficiently in different fields or environments and avoid unnecessary energy consumption.

Figure 2:
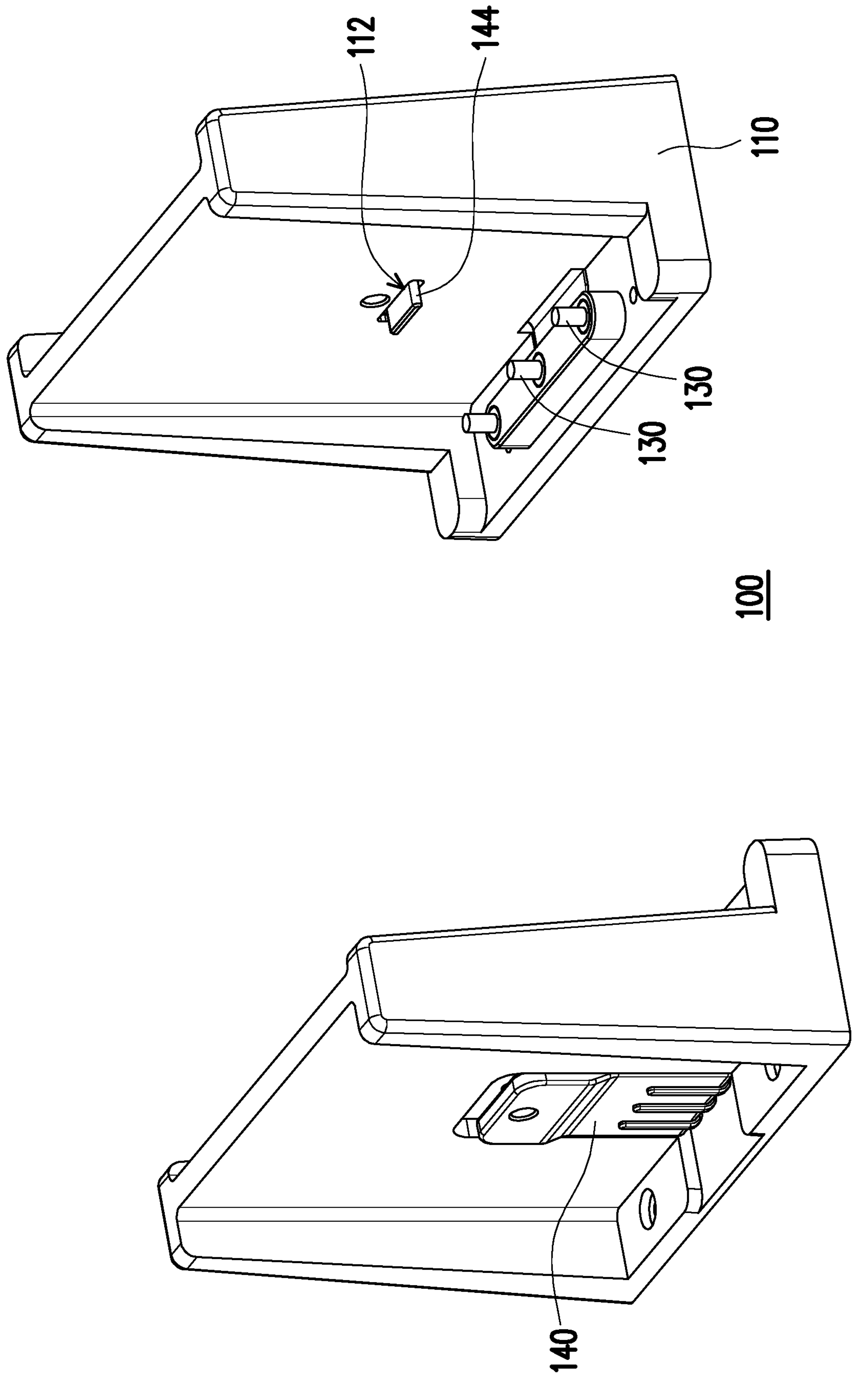
FIG. 2 is a schematic diagram of an antenna base of the antenna set of FIG. 1.

FIG. 2 is a schematic diagram of an antenna base of the antenna set of FIG. 1. Referring to FIG. 1 and FIG. 2, the antenna base 100 of the embodiment includes a body 110, a plurality of antennas 120 and a plurality of second connectors 130. The antennas 120 are installed at the body 110. The body 110 in FIG. 1 is shown in a transparent manner so that the antennas 120 inside can be seen. The second connectors 130 are electrically connected to the antenna 120. The body 110 of the antenna base 100 of the embodiment includes two separate parts, but the body 110 of other embodiments may be formed as a single component. When the body 110 includes two separate parts, the distance between the two separate parts can be changed according to the size of the host 52, and is suitable for corresponding to the host 52 of multiple different sizes. The second connectors 130 and the antennas 120 are electrically connected, for example, through coaxial cables (not shown), but the electrical connection between the two can also be in many other ways, which are not limited thereto.

Figure 3:
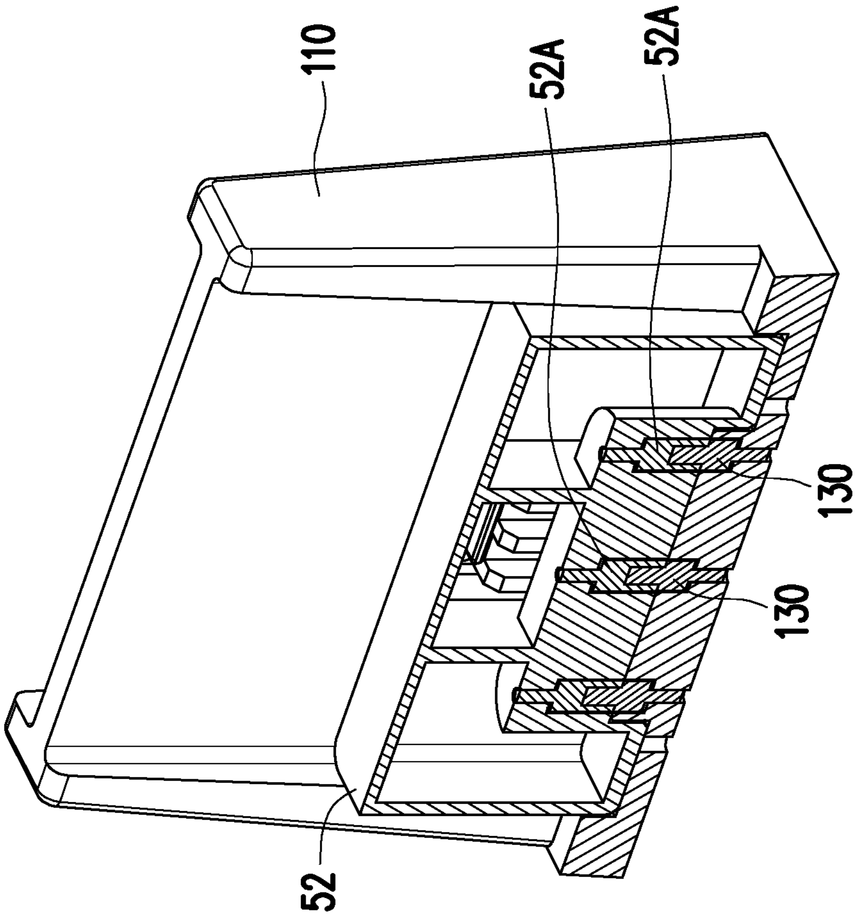
FIG. 3 is a partial cross-sectional view of the antenna base of FIG. 2.

FIG. 3 is a partial cross-sectional view of the antenna base of FIG. 2. Referring to FIG. 1 and FIG. 3, a plurality of first connectors 52A are fixed on the host 52 of the embodiment. That is to say, the first connectors 52A are fixed on the host 52 and cannot rotate or move relative to the host 52 because the user has no need to adjust or rotate the first connectors 52A.

In the embodiment, the assembly of the host 52 and the body 110 and the electrical and structural connection of the first connectors 52A and the second connectors 130 are completed simultaneously. That is to say, as long as the assembly of the host 52 and the body 110 is completed, the connection of the first connectors 52A and the second connectors 130 will also be completed at the same time. Since the host 52 is assembled to the predetermined position on the body 110, the first connectors 52A will also be at the position where the connection with the second connector 130 is completed. During the connection process of the first connectors 52A and the second connectors 130, there is no need to rotate the first connectors 52A and the second connectors 130 relative to each other as in the prior art. That is to say, the first connectors 52A and the second connectors 130 of the embodiment are not connected by screwing.

From the above it can be seen that, in the antenna base 100 and the antenna set 50 of the embodiment, since the assembly of the host 52 and the body 110 and the electrical and structural connection of the first connectors 52A and the second connectors 130 are completed simultaneously, the assembly is simple and fast. Compared with the prior art, which requires time to connect different antennas individually, the assembly process of the antenna base 100 and the antenna set 50 of the embodiment is simplified and the assembly time is short.

In the embodiment, the first connectors 52A and the second connectors 130 are closely connected, but the application is not limited thereto. That is to say, the first connectors 52A and the second connectors 130 are physically and electrically connected simply by matching the dimensions. In the embodiment, the second connectors 130 may be coaxial connectors, probes, spring fingers, or other connectors. In the embodiment, the antenna 120 includes any multiple of a GPS antenna, a GSM antenna, a CDMA antenna, a Bluetooth antenna, a WIFI antenna, a VHG antenna, a UWB antenna, a mobile communication antenna and an RFID antenna. In other words, the antenna base 100 can provide a variety of the antenna 120 to meet the needs of the host 52.

Figure 4:
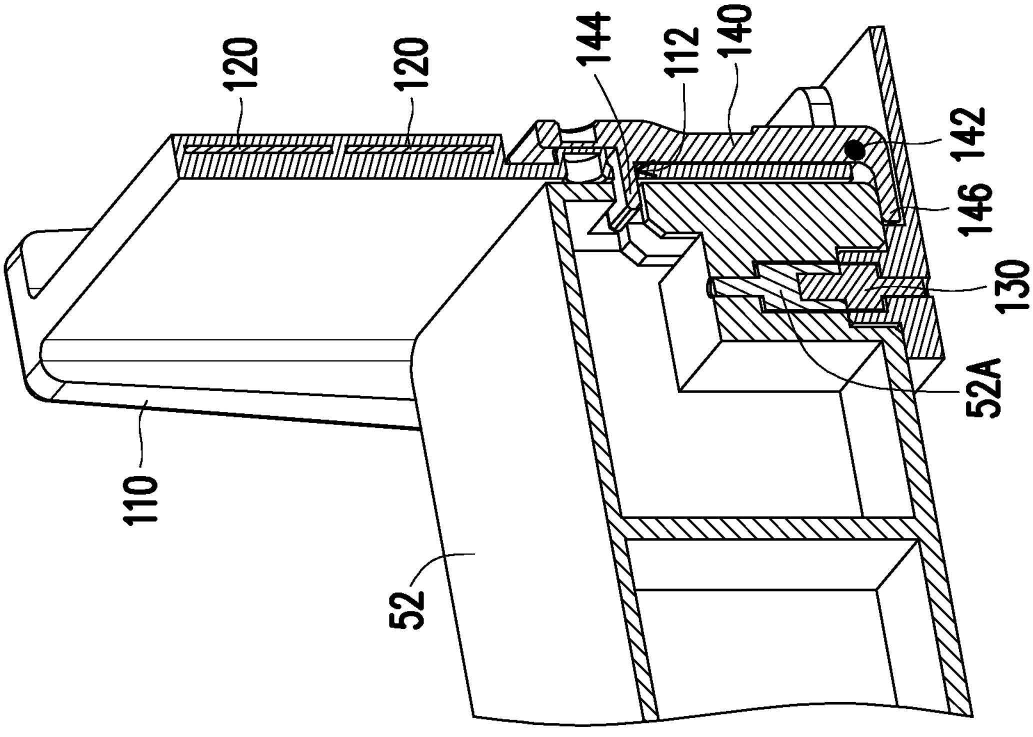
FIG. 4 is another partial cross-sectional view of the antenna base of FIG. 2.
Figure 5:
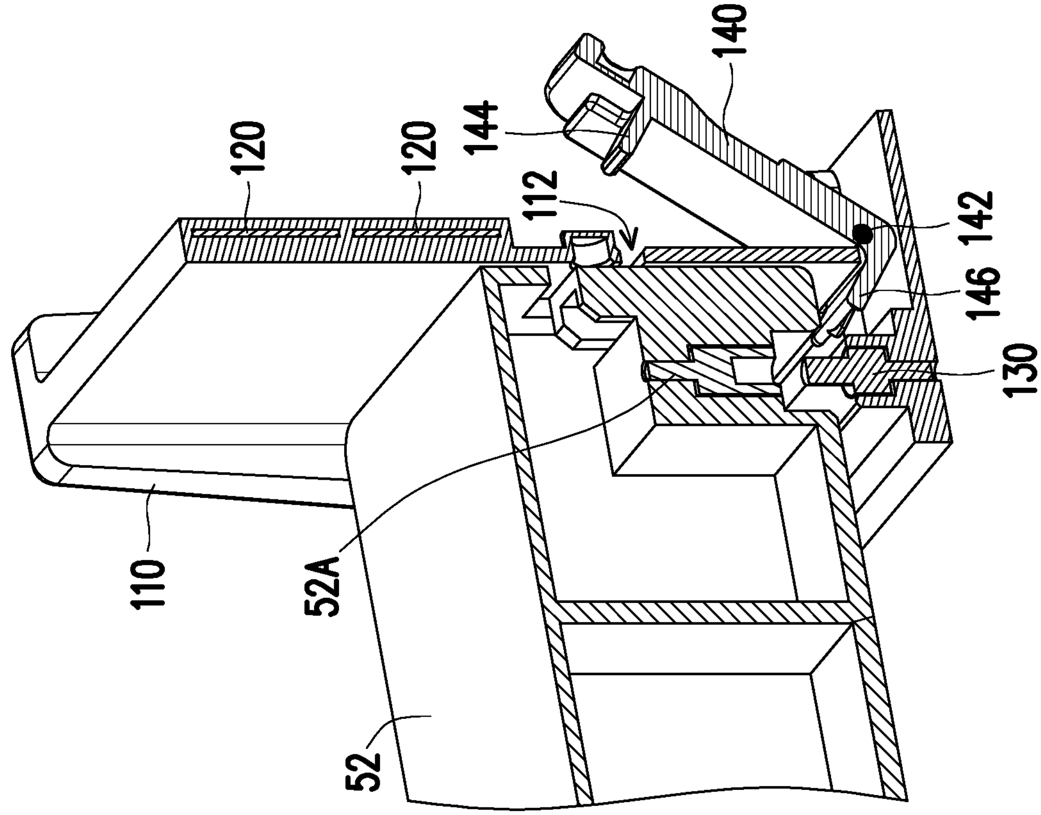
FIG. 5 is a partial cross-sectional view of the antenna base of FIG. 2 in an unlocked state.

FIG. 4 is another partial cross-sectional view of the antenna base of FIG. 2. FIG. 5 is a partial cross-sectional view of the antenna base of FIG. 2 in an unlocked state. Referring to FIG. 4, in the embodiment, the antenna base 100 further includes a latch 140. The latch 140 has a pivot portion 142 and a buckle portion 144 and a contact portion 146 located on opposite sides of the pivot portion 142. The latch 140 is pivoted to the body 110 with the pivot portion 142. When the host 52 is assembled on the body 110, the buckle portion 144 locks the host 52, so that the host 52 is fixed to the body 110 without being detached from the body 110. In the embodiment, the body 110 has a perforation 112, and the buckle portion 144 of the latch 140 passes through the perforation 112 and locks the host 52.

Referring to FIG. 5, when the host 52 is to be detached from the antenna base 100, the latch 140 is rotated to move the buckle portion 144 away from the host 52, that is, the buckle portion 144 no longer locks the host 52, so that the host 52 can be separated from the body 110. At this time, the contact portion 146 pushes up the host 52 to move it away from the body 110. That is to say, when the latch 140 is rotated to release the buckle portion 144 from the host 52, the contact portion 146 can also be used to push up the host 52 and disconnect the first connectors 52A and the second connectors 130, making the disassembly of the host 52 easier.

Figure 6:
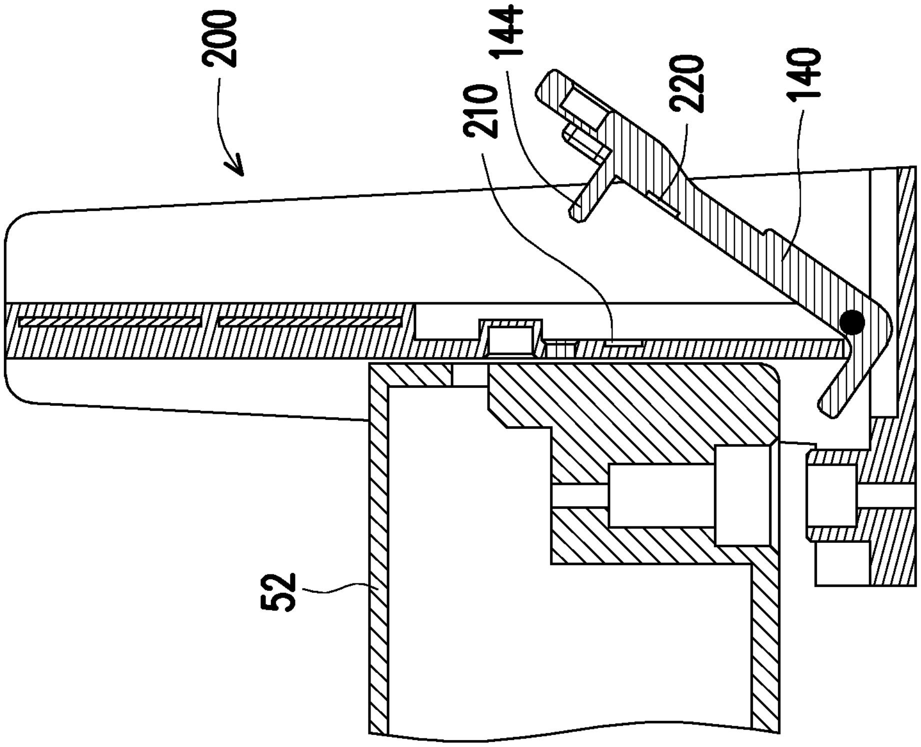
FIG. 6 is a partial cross-sectional view of the antenna base of the antenna set in the unlocked state according to another embodiment of the present invention.

FIG. 6 is a partial cross-sectional view of the antenna base of the antenna set in the unlocked state according to another embodiment of the present invention. Referring to FIG. 6, the antenna base 200 of the embodiment is substantially the same as the antenna base 100 of FIG. 1, and only the differences will be described here. In the embodiment, the antenna base 200 further comprises a first magnetic piece 210 and a second magnetic piece 220. The first magnetic piece 210 is disposed on the body 110. The second magnetic piece 220 is disposed on the latch 140. The magnetic attraction between the first magnetic piece 210 and the second magnetic piece 220 keeps the latch 140 in place where the buckle portion 144 locks the host 52. Therefore, after the buckle portion 144 of the latch 140 locks the host 52, the magnetic attraction between the first magnetic piece 210 and the second magnetic piece 220 can prevent the latch 140 from being detached, thereby ensuring that the host 52 can be firmly assembled on the antenna base 200.

Figure 7:
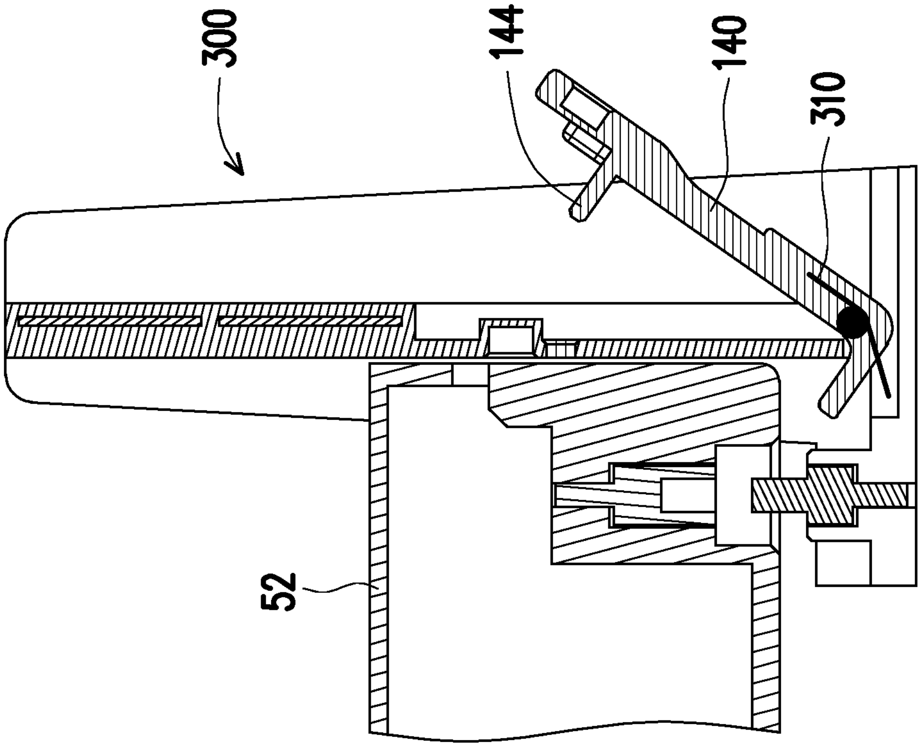
FIG. 7 is a partial cross-sectional view of the antenna base of the antenna set in an unlocked state according to yet another embodiment of the present invention.

FIG. 7 is a partial cross-sectional view of the antenna base of the antenna set in an unlocked state according to yet another embodiment of the present invention. Referring to FIG. 7, the antenna base 300 of the embodiment is substantially the same as the antenna base 100 of FIG. 1, and only the differences will be described here. In the embodiment, the antenna base 300 further includes a torsion spring 310, which is disposed between the latch 140 and the body 110. The elastic recovery power of the torsion spring 310 keeps the latch 140 in place where the buckle portion 144 locks the host 52. Therefore, after the buckle portion 144 of the latch 140 locks the host 52, the elastic recovery power of the torsion spring 310 can prevent the latch 140 from being detached, thereby ensuring that the host 52 can be firmly assembled on the antenna base 300.

Figure 8:
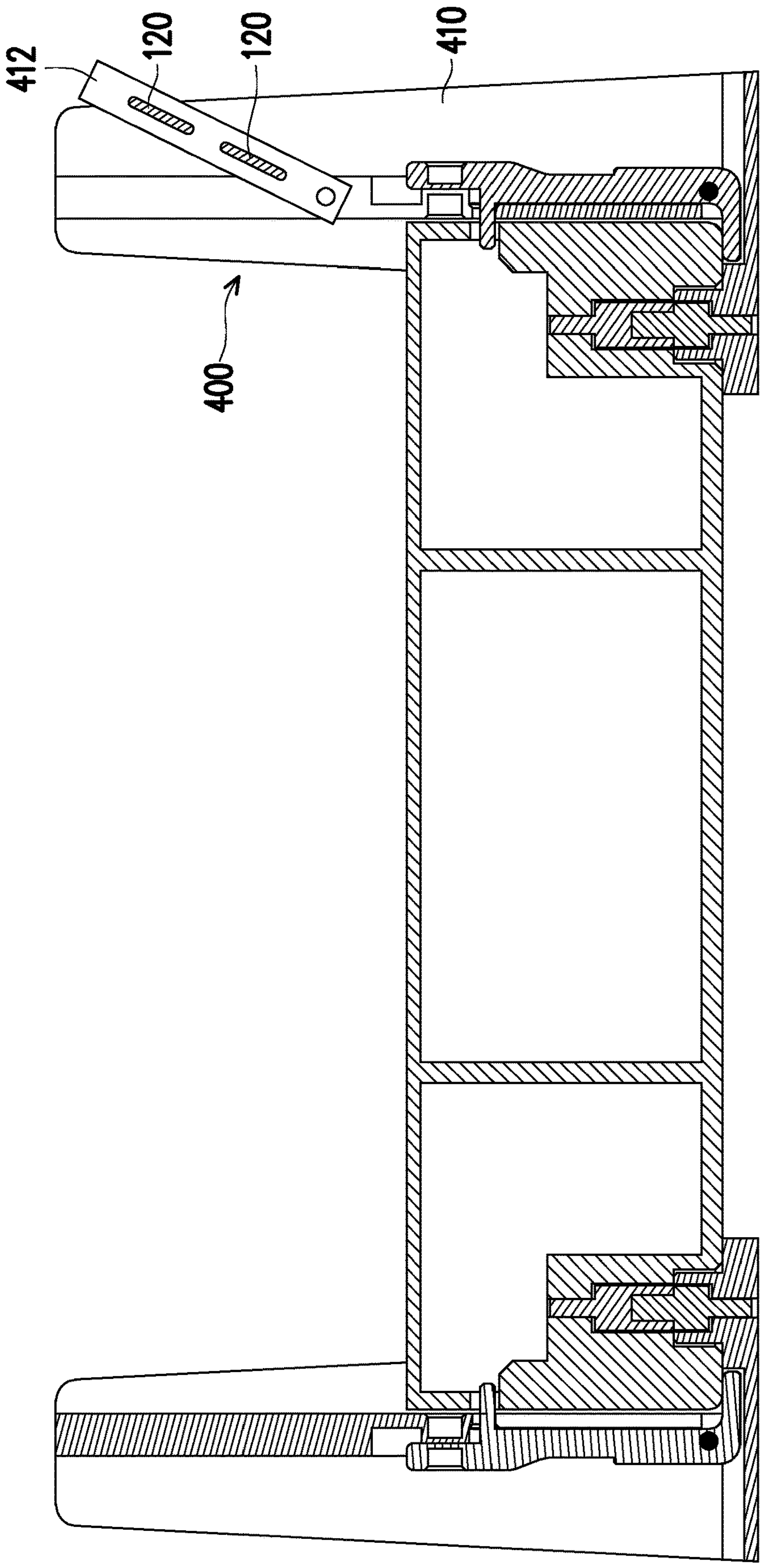
FIG. 8 is a cross-sectional view of the antenna set according to yet another embodiment of the present invention.

FIG. 8 is a cross-sectional view of the antenna set according to yet another embodiment of the present invention. Referring to FIG. 8, the antenna base 400 of the embodiment is substantially the same as the antenna base 100 of FIG. 1, and only the differences will be described here. In the embodiment, a posture of the antenna 120 is adjustable. That is to say, the antenna 120 can rotate uniaxially or multi-axially relative to other parts of the antenna base 400 in order to obtain the best signal reception effect. For example, the body 410 of the antenna base 400 has a carrying portion 412. The posture of the carrying portion 412 relative to other parts of the body 410 is adjustable, and therefore the posture of the antenna 120 mounted on the carrying portion 412 is also adjustable. In other embodiments, the antenna 120 may be directly pivoted to the body 410 so that the posture of the antenna 120 is adjustable. The application does not limit how to realize the adjustable posture of the antenna 120.

Figure 9:
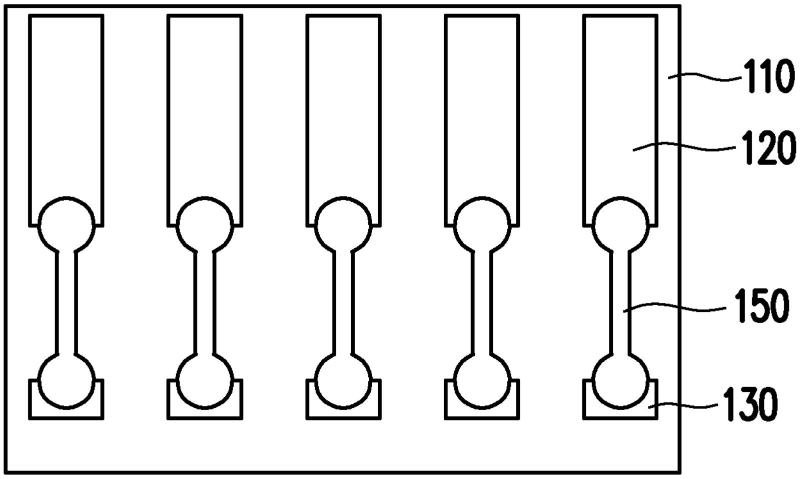
FIG. 9 is a schematic diagram of the connection structure of the antenna base of the antenna set of FIG. 1.

FIG. 9 is a schematic diagram of the connection structure of the antenna base of the antenna set of FIG. 1. The presentation of each component in FIG. 9 is only schematic for convenience of explanation and does not represent the specific appearance of each component. Referring to FIG. 9, the body 110 of the embodiment can be made of a plastic casing. The antenna 120 is made on the circuit board and then installed in the body 110, and the coaxial cable 150 is then used to connect it to the second connectors 130 in a one-to-one manner.

Figure 10:
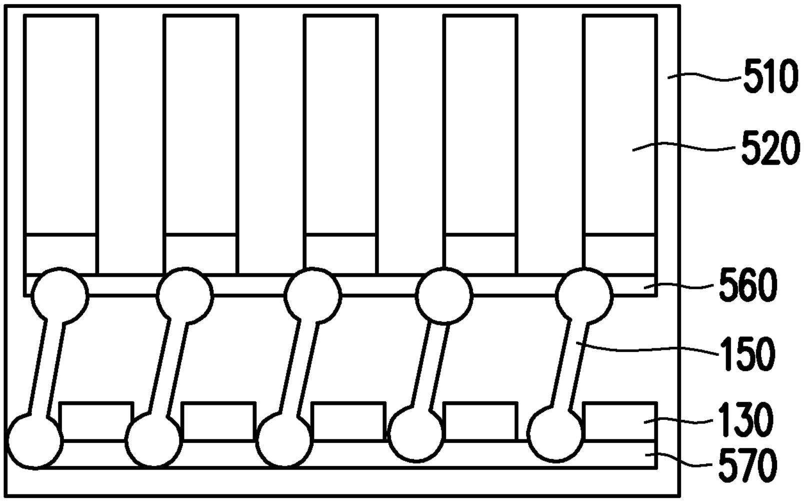
FIG. 10 is a schematic diagram of the connection structure of the antenna base of the antenna set according to another embodiment of the present invention.

FIG. 10 is a schematic diagram of the connection structure of the antenna base of the antenna set according to another embodiment of the present invention. Referring to FIG. 10, the antenna base of the embodiment is substantially the same as the antenna base 100 of FIG. 1, and only the differences will be described here. The body 510 in the embodiment is mainly made of plastic, and the antenna 520 is directly formed on the inner surface of the body 510 using Laser Direct Structuring (LDS) technology. Then, the circuit board 560 is placed in the body 510, and the terminals of the circuit board 560 are connected to the antenna 520 correspondingly. The terminals of the circuit board 560 can be probes, spring clips or other types. The coaxial cable 150 is then used to connect the antenna 520 to the second connectors 130 on the circuit board 570 through the terminals of the circuit board 560 in a one-to-one manner.

Figure 11:
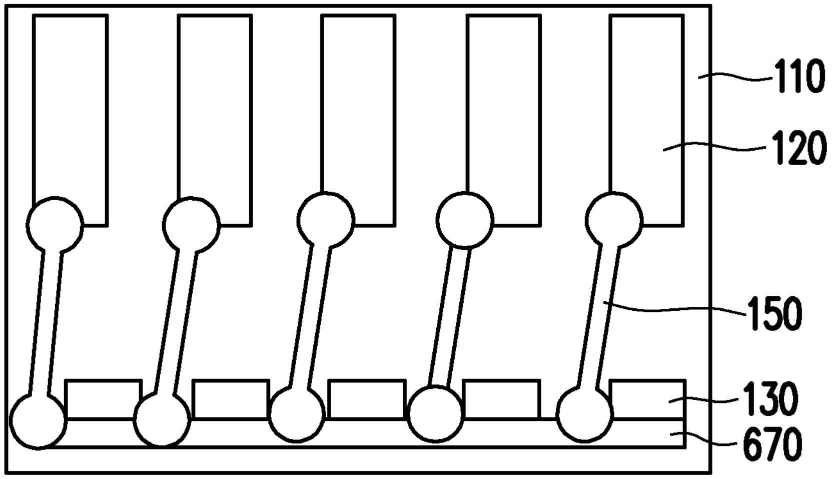
FIG. 11 is a schematic diagram of the connection structure of the antenna base of the antenna set according to yet another embodiment of the present invention.

FIG. 11 is a schematic diagram of the connection structure of the antenna base of the antenna set according to yet another embodiment of the present invention. Referring to FIG. 11, the antenna base of the embodiment is substantially the same as the antenna base 100 of FIG. 1, and only the differences will be described here. The body 110 of the embodiment can be made of a plastic casing, and the antennas 120 are made on a circuit board and then installed in the body 110. The coaxial cable 150 is then used to connect the antennas 120 to the second connectors 130 on the circuit board 670 in a one-to-one manner.

In each of the above embodiments, the body is not limited to the plastic casing. For example, the casing of the body may also be made of Nano Molding Technology (NMT), that is, metal and plastic are combined with nanotechnology.

In summary, in the antenna base and the antenna set of the application, a plurality of antennas are built into the antenna base, and the connection between the antenna and the host and the assembly of the host and the antenna base are completed simultaneously, which simplifies the assembly process and shortens the assembly time.

What is claimed is:

1. An antenna base, used for a host detachably assembled thereon, wherein the host is fixed with a plurality of first connectors, the antenna base comprises:

a body;

a plurality of antennas, installed at the body; and a plurality of second connectors, electrically connected to the plurality of antennas, wherein an assembling of the host and the body and an electrical and structural connection of the first connector and the second connector are completed in the same time, wherein the latch has a pivot portion and a buckle portion and a contact portion located on opposite sides of the pivot portion, the latch is pivoted to the body with the pivot portion, when the host is assembled on the body, the buckle portion locks the host, when the latch is rotated to move the buckle portion away from the host, the contact portion pushes up the host away from the body, and wherein postures of the plurality of antennas are adjustable.

2. The antenna base according to claim 1, further comprises a first magnetic piece and a second magnetic piece, wherein the first magnetic piece is disposed on the body, the second magnetic piece is disposed on the latch, a magnetic attraction between the first magnetic piece and the second magnetic piece keeps the latch in place where the buckle portion locks the host.

3. The antenna base according to claim 1, further comprises a torsion spring, disposed between the latch and the body, wherein an elastic recovery power of the torsion spring keeps the latch in place where the buckle portion locks the host.

4. The antenna base according to claim 1, wherein the plurality of first connectors and the plurality of second connectors are closely connected.

5. The antenna base according to claim 1, wherein the plurality of second connectors are coaxial connectors.

6. An antenna set, comprising:

a host, wherein the host is fixed with a plurality of first connectors;

an antenna base, wherein the host is detachably assembled to the antenna base, the antenna base comprises:

a body;

a plurality of antennas, installed at the body; and a plurality of second connectors, electrically connected to the plurality of antennas, wherein an assembling of the host and the body and an electrical and structural connection of the first connector and the second connector are completed in the same time, wherein the antenna base further comprises a latch, wherein the latch has a pivot portion and a buckle portion and a contact portion located on opposite sides of the pivot portion, the latch is pivoted to the body with the pivot portion, when the host is assembled on the body, the buckle portion locks the host, when the latch is rotated to move the buckle portion away from the host, the contact portion pushes up the host away from the body, and wherein postures of the plurality of antennas are adjustable.

7. The antenna set according to claim 6, wherein the antenna base further comprises a first magnetic piece and a second magnetic piece, wherein the first magnetic piece is disposed on the body, the second magnetic piece is disposed on the latch, a magnetic attraction between the first magnetic piece and the second magnetic piece keeps the latch in place where the buckle portion locks the host.

8. The antenna set according to claim 6, wherein the antenna base further comprises a torsion spring, disposed between the latch and the body, wherein an elastic recovery power of the torsion spring keeps the latch in place where the buckle portion locks the host.

9. The antenna set according to claim 6, wherein the plurality of first connectors and the plurality of second connectors are closely connected.

10. The antenna set according to claim 6, wherein the plurality of second connectors are coaxial connectors.

* * * * *